(12) United States Patent
Doi et al.

(10) Patent No.: US 7,659,960 B2
(45) Date of Patent: Feb. 9, 2010

(54) LIQUID CRYSTAL DISPLAY DEVICE WITH SPHERICAL SPACERS IN CONTACT HOLES

(75) Inventors: Takashi Doi, Saitama (JP); Daisuke Miyazaki, Saitama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 349 days.

(21) Appl. No.: 11/338,777

(22) Filed: Jan. 25, 2006

(65) Prior Publication Data
US 2006/0181667 A1 Aug. 17, 2006

(30) Foreign Application Priority Data
Jan. 27, 2005 (JP) ............................. 2005-020417

(51) Int. Cl.
G02F 1/1339 (2006.01)
G02F 1/13 (2006.01)

(52) U.S. Cl. ...................................... 349/155; 349/187

(58) Field of Classification Search ................ 349/106, 349/155–157
See application file for complete search history.

(56) References Cited
U.S. PATENT DOCUMENTS
6,724,448 B2 * 4/2004 Nakahara .................... 349/123

| 6,842,278 | B1 * | 1/2005 | Sakamaki et al. | 359/296 |
|---|---|---|---|---|
| 6,870,592 | B1 * | 3/2005 | Yamamoto et al. | 349/155 |
| 7,180,559 | B2 * | 2/2007 | Chang et al. | 349/106 |
| 2003/0123018 | A1 * | 7/2003 | Kim et al. | 349/155 |
| 2004/0109126 | A1 * | 6/2004 | Washizawa et al. | 349/155 |
| 2004/0114090 | A1 | 6/2004 | Washizawa et al. | |
| 2006/0119259 | A1 * | 6/2006 | Bae et al. | 313/506 |

FOREIGN PATENT DOCUMENTS

| JP | 11-65479 | 3/1999 |
|---|---|---|
| JP | 2000-29055 | 1/2000 |
| JP | 2004-145101 | 5/2004 |
| KR | 10-2004-0036640 | 4/2004 |

* cited by examiner

*Primary Examiner*—David Nelms
*Assistant Examiner*—Jessica M Merlin
(74) *Attorney, Agent, or Firm*—Oblon, Spivak, McClelland, Maier & Neustadt, L.L.P.

(57) ABSTRACT

An LCD (liquid-crystal display) device comprising: first and second substrates; a liquid-crystal layer formed of a liquid crystal material and sandwiched as held between the substrates; spherical spacers arranged between the substrates; and recesses on surfaces contacting the liquid-crystal layer, of the substrates; and each of the spherical spacers being placed in respective one of the recesses. A manufacturing method of the LCD device comprising: forming recesses distributed on a main face of either of the first and second substrates; and preparing a plurality of spherical spacers on said recesses.

11 Claims, 4 Drawing Sheets

LIQUID CRYSTAL DISPLAY DEVICE WITH SPHERICAL SPACERS IN CONTACT HOLES

CROSS-REFERENCE TO RELATED APPLICATION

This application is based upon and claims the benefit of priority from the prior Japanese Patent Application No. 2005-020417, filed on Jan. 27, 2005; the entire contents of which are incorporated herein by reference.

FIELD OF THE INVENTION

This invention relates to a liquid-crystal display (LCD) device, in which a liquid-crystal layer is held between a pair of substrates as to adjust and control light transmission or light reflection, and also relates to a manufacturing method of the LCD device. The invention particularly relates to a method of manufacturing an LCD device having spherical spacers or spherical particles for spacing between the pair of substrates.

BACKGROUND ART

Recently, liquid crystal display devices and other flat-panel display devices are used in various fields as image display devices for personal computers, word processor-dedicated machines, television set or the like as well as for a projector display device; in view of their small depth dimension and small weight as well as small electric power consumption.

Active-matrix liquid crystal display (active-matrix LCD) devices in particular, which has pixel-switching elements arranged on each display pixel electrode, enables to achieve good image quality without crosstalk between adjacent pixels. Because of these features, active-matrix LCD devices are being earnestly investigated and developed.

In following, a light transmissive one of the active-matrix LCD devices is exemplified for explaining its construction.

An active-matrix LCD device is comprised of a matrix array substrate (hereinafter referred as array substrate) and a counter substrate, which are closely opposed to each other with a predetermined gap, and of a liquid crystal layer held in the gap.

The array substrate has signal lines and scanning lines, which are arranged in a latticework on an insulator substrate such as a glass plate, and are overlapped to sandwich an insulator film. On each rectangular patch defined by the signal and scanning lines, a pixel electrode is disposed and formed of a transparent electro-conductive material such as Indium-doped tin oxide (ITO). At around each crossing of the signal and scanning lines, a pixel-switching element is disposed for controlling a respective pixel electrode. When the pixel-switching element is a thin film transistor (TFT), gate and signal electrodes of the TFT are respectively connected with scanning and signal lines; and a source electrode of the TFT is connected with a pixel electrode.

The counter substrate has a counter electrode formed of a transparent electro-conductive material such as indium-doped tin oxide (ITO), on an insulator substrate such as a glass plate. When to realize color display, color filter layers are formed on the array or counter substrate.

Conventionally, as to achieve uniform and constant thickness of the liquid-crystal layer, spherical resin beads of uniform diameter are sprayed on either of the array and counter substrates as spacers, before attaching the substrates with each other. This technique of spraying the spherical beads or spacers has following drawbacks. (1) Spherical spacers are partly agglomerated; and in severe occasions, defects of luminous dot appear on screen of the display. (2) Due to uneven distribution of the spherical spacers, an area scarce of the spacers may arise and become smaller in thickness dimension of the liquid-crystal layer compared to other areas; and in such occasion, unevenness of contrast ratio within the display screen will be arisen as to deteriorate quality of image displaying. (3) The spherical spacers are distributed even in display regions each within a pixel dot. This causes "light leakage", which means light passing through the liquid-crystal layer irrespective of voltage applied to the layer; through the spherical spacers by themselves; and through portions around the spherical spacers, at which orientation of liquid-crystal molecules is deteriorated by the spacers. (4) A designed gap and/or stress distribution between the substrates are made uneven by the spherical spacers put on raised parts (such as TFTs) and those put on the other parts on the array substrate.

Hence, there has been also adopted a technique of forming projections or pillar spacers on either of the substrates by film formation and subsequent patterning. Please see JP-2000-029055A, that is, Japan's Kokai or patent publication of the application No. 2000-029055. By such technique, the spacers are placed surely on intended position. Each of the pillar spacer may be arranged in an area fairly smaller than a storage-capacity area within a pixel dot; thus, even when the pillar spacers are formed on the counter substrate, alignment error between the substrates may be absorbed by such area-wise margin.

Nevertheless, when projection-wise dimension of the pillar spacers is large, it is rather difficult to achieve sufficient curing of the basal parts of the pillar spacers; and thus, some trouble arises in a manufacturing process. Moreover, when brushing is made for cleaning, portions of the pillar spacers are chipped off or scraped away. Because of such chipping or scraping along with the insufficient curing of the basal parts, troublesome unevenness arises in thickness of the liquid crystal layer.

Meanwhile, investigation on ink-jet technique has been made as to arrange the spherical spacers in predetermined positions on the substrate. Please see JP-2004-145101A. A nozzle head having a row of nozzle apertures is intermittently moved by a predetermined interval while emitting dispersion medium or liquid containing the spherical spacers. When the dispersion medium is evaporated, the spherical spacers are disposed in the predetermined positions on the storage-capacity forming area or the like. Nevertheless, the spherical spacers are occasionally shifted and deviated from the predetermined positions, on course of placing the spacers by the ink-jet technique, or after the placing of the spacers. Adhesives have been occasionally used for fixing the spherical spacers; nevertheless, the spacers sometimes are shifted or migrate before curing of the adhesive.

In otherwise, JP-1999 (H11)-65479A proposes a following method. The spherical spacers of small and larger diameters are arranged on the substrate by use of the ink-jet technique in order that the small ones are placed on the electrodes and the larger ones are placed on other areas. By this method, the gap between the substrates may be curbed to be fluctuated between areas of the electrodes that are somewhat raised from surroundings and the other areas. Nevertheless, the method of JP-1999-65479A does not completely eliminate troubles that may be caused by such as partial deviation of the spherical spacers. In particular, the method of JP-1999-65479A is hardly applicable when area-wise dimensions of the electrodes are small. In general, the method is practically applicable only to the LCD devices of STN (non-active simple matrix), we believe.

In view of the above drawbacks of using the spherical spacers in the LCD devices and its manufacturing method, it is aimed to curb positional deviation of the spherical spacers and curb unevenness in gap and/or stress between the substrates.

BRIEF SUMMARY OF THE INVENTION

Invention-wise LCD device is comprised of: first and second substrates; a liquid-crystal layer formed of a liquid crystal material and sandwiched as held between the substrates; spherical spacers arranged between the substrates; and recesses on surfaces contacting the liquid-crystal layer, of the substrates; and each of the spherical spacers being placed in respective one of the recesses.

Invention-wise manufacturing method of LCD device, in which a liquid-crystal layer formed of a liquid crystal material is sandwiched and held between first and second substrates, is comprised of: forming of scanning lines, signal lines perpendicularly crossing the scanning lines, pixel-switching elements respectively arranged in vicinity of crossing points of the scanning lines and the signal lines, and pixel electrodes, on a main face of the first substrate; forming recesses distributed on a main face of either of the first and second substrates; and preparing a plurality of spherical spacers on said recesses.

By such construction, the spherical spacers are arranged in a reliable and stable manner on their predetermined positions. Thus, unevenness in gap and/or press-wise stress distribution between the substrates is curbed, which may be otherwise caused due to positional error of the spherical spacers and raised portions or projections on the substrate.

DETAILED DESCRIPTION OF THE INVENTION

An embodiment of the invention and its manufacturing method will be described with reference to FIGS. 1 through 9. Exemplified in following explanation is an array substrate for a transmission liquid crystal display device, which has polycrystalline silicone (p-Si: to be referred as polysilicone) TFTs for respective pixel electrodes as switching elements.

Figure 1:
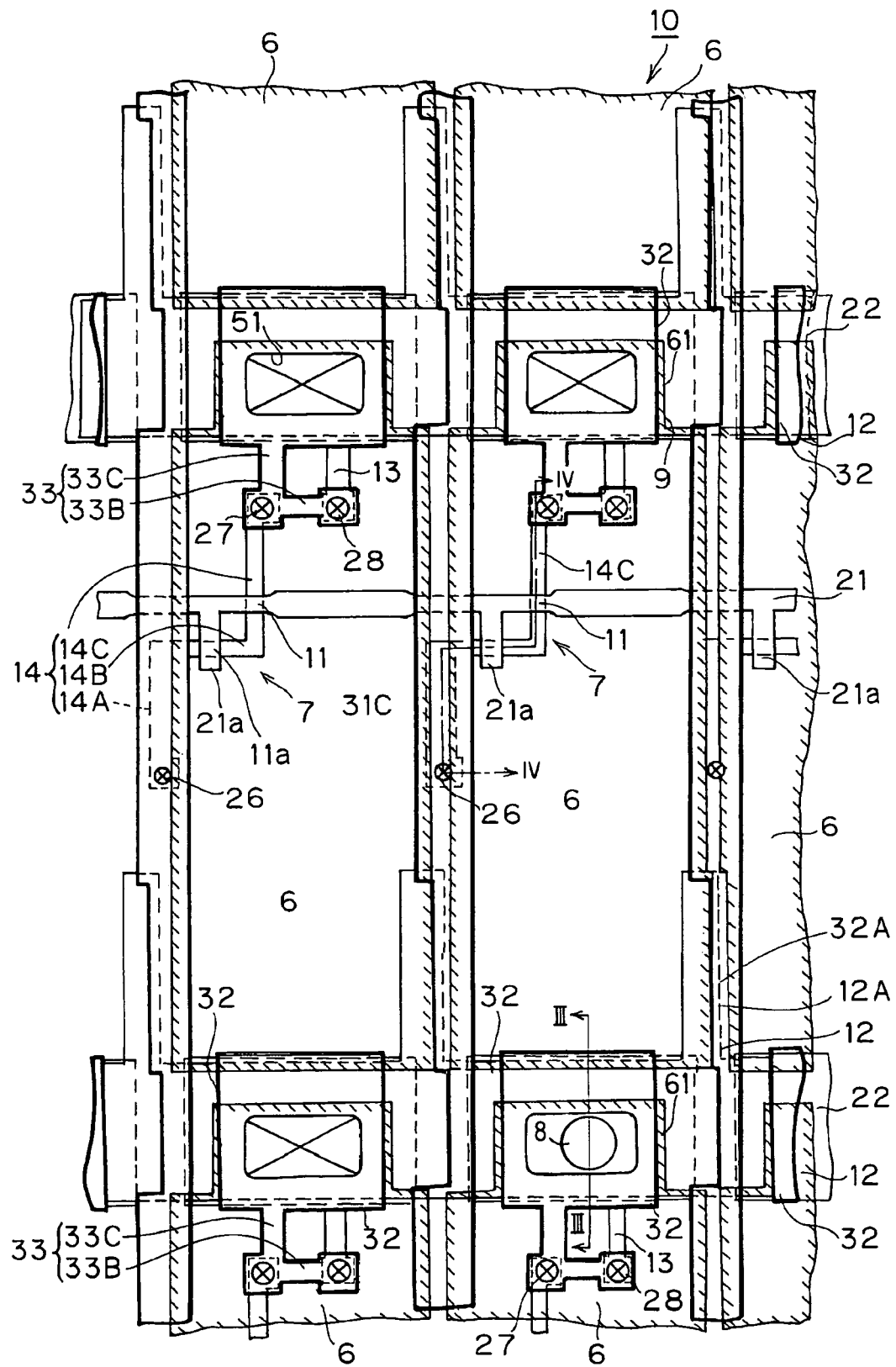
FIG. 1 is a partial plan view schematically showing a construction of each pixel dot on an array substrate of the embodiment.
Figure 2:
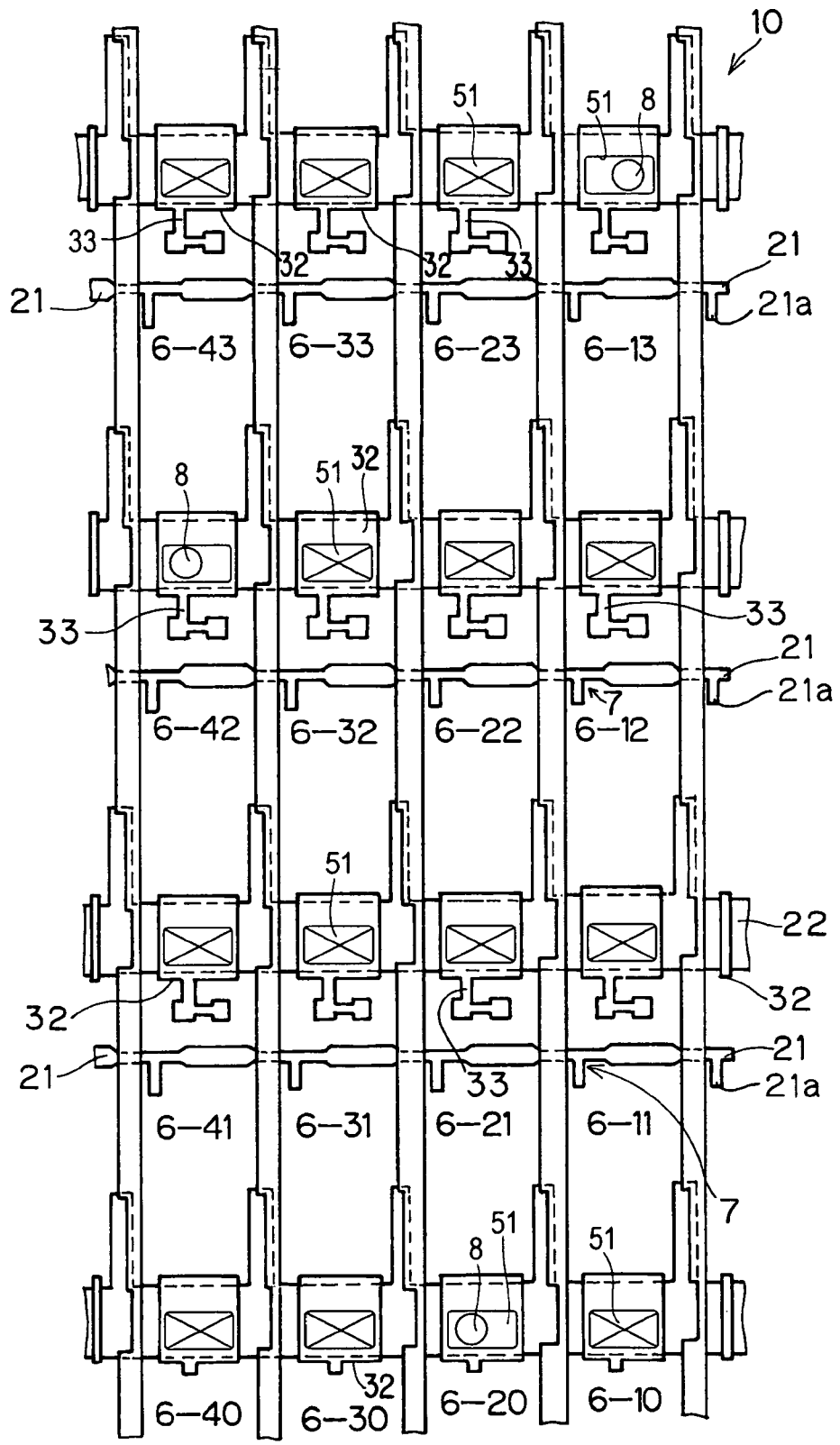
FIG. 2 is a schematic partial plan view of array substrate of the embodiment, showing an example of arrangement of the spherical spacers on the array substrate, in which contours other than metal patterns and the spherical spacers are omitted.

FIGS. 1 and 2 are plan views showing essential parts of an array substrate 10. FIG. 1 shows construction of a pixel dot having a spherical spacer 8 and neighboring pixel dots. FIG. 2 shows an arrangement of somewhat larger number of pixel dots including those shown in FIG. 1, in which contours other than metal patterns and the spherical spacers are omitted. As shown in the figures, scanning lines 21 and signal lines 31 are perpendicularly crossing each other to be arranged in a latticework formation. In vicinity of each cross point, a TFT 7 is constructed. Along and in vicinity of each of the scanning lines 11, a storage capacitor (Cs) line is disposed. In substantial conformity to latticework apertures or pixel-dot apertures, pixel electrodes 6 are arranged in a matrix formation. Fringe portions of the pixel electrodes 6 are overlapped with fringe portions of signal lines 31 and storage capacitor lines 12.

Each of the pixel electrodes 6 is extended from its fringe portion overlapping the storage capacitor line 12 at a side nearer to an associated one of the TFTs 7 and as spaced apart from the signal lines 31, as to form a pixel-electrode extension 61. The pixel-electrode extension 61 overlaps with an island metal pattern 32 at underneath or underlayer, with a thick resin film 5 therebetween, and electrically connected with the metal pattern 32 through a pixel-electrode contact hole 51 perforating the thick resin film 5. In an illustrated example, the pixel-electrode contact hole 51 occupies 60 through 70% of an area of the pixel-electrode extension 61. In its dimension-wise detailed example, surface-side aperture fringe or contour of the pixel-electrode contact hole 51 has a width of 10 µm and a length of 15 µm, while bottom face of the contact hole 51 has a width of 6-8 µm and a length of 10 µm. The island metal pattern 32 has an L-shaped extension 33, which extends into a pixel-dot aperture and is formed of a proximal linear part 33C and a distal linear part 33B. The L-shaped extension 33 has, at its angled portion, a contact hole 27 and is electrically connected with a source-electrode terminal of the TFT through the contact hole 27 and a polysilicone wiring 14C. Thus, the pixel electrode 6 is electrically connected to the source-electrode terminal of the TFT, through the island metal pattern 32 and the polysilicone wiring 14C.

The drain-electrode terminal of the TFT 7 is electrically connected to the signal line 31 by way of; a wiring 14A formed of a polysilicone layer; and a contact hole 26 that perforates a gate insulator film 15 and an inter-layer insulator 25 at within a contour of the signal line 31. In an illustrated example, the contact hole 26 is spaced apart from the TFT 7, and the wiring 14A runs along the signal line 31 toward a nearest scanning line 21 and then turn perpendicularly into a direction of the scanning lines. The TFT 7 is of top-gate structure as shown in a multi-layer sectional view of FIGS. 1 and 4. Two gate-electrode terminals respectively formed of the scanning line 21 by itself and its branch 21a are intersected with polysilicone wiring 14. Channel regions of the TFTs are formed at portions overlapping the gate-electrode terminals, within a contour of the polysilicone wiring 14. At between the channel regions, a kind of mere electric wiring 14B is formed.

Figure 3:
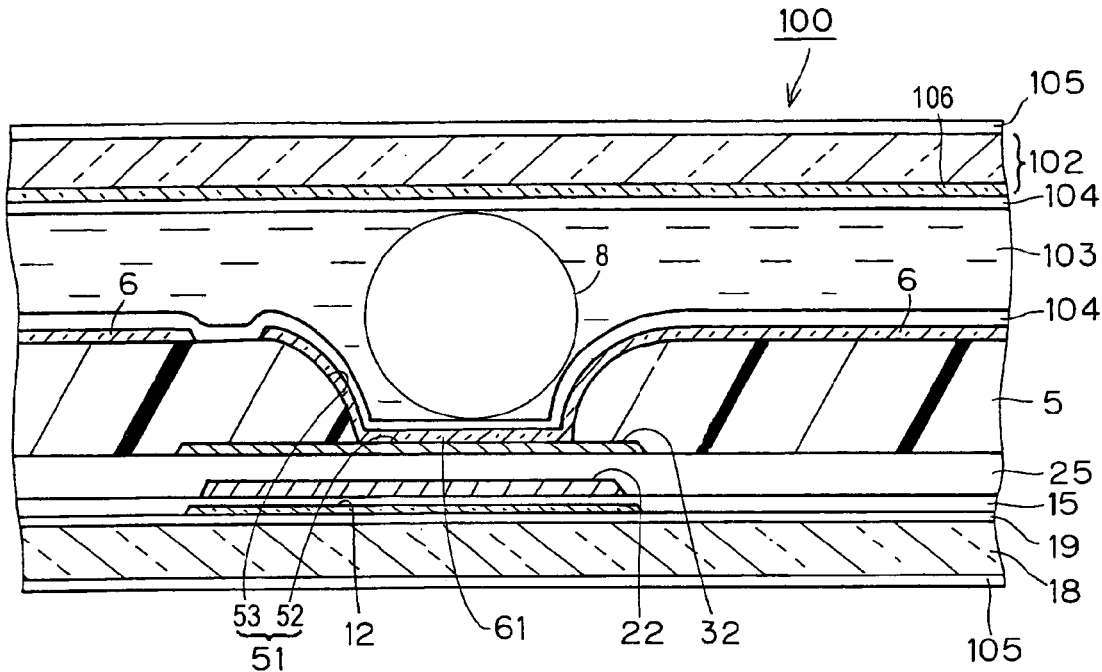
FIG. 3 is a sectional view of the LCD device of the embodiment, schematically showing multi-layer structure at around a spherical spacer placed in a contact hole.

As shown in FIGS. 1 and 3, a rectangular island-wise polysilicone pattern 12 is formed to be nearly congruent with each segment, of the storage capacitor line 22, sandwiched by the signal lines 31. The island-wise polysilicone pattern 12 overlaps the storage capacitor line 22 as the gate insulator film 15 being interlaid therebetween, and has a linear extension 13 extended into a pixel dot aperture. As shown in FIG. 1, a distal end of the linear extension 13 is overlapped and electrically connected with a distal end of the L-shaped extension 33 of the metal island pattern 32, through a contact hole 28 perforating the gate and interlayer insulator films 15 and 25. Thus, the island-wise polysilicone pattern 12 is electrically connected with the pixel electrode 6 by way of the island metal pattern 32 as to form a storage capacitor for the pixel electrode 6, along with the island metal pattern 32.

In a detailed example illustrated in the plan view of FIG. 2, three to five ones of the spherical spacers 8 are arranged on every 16 pixel dots, which correspond the pixel electrodes designated as 6-10, . . . , 6-13, . . . , 6-40, . . . , 6-43, as to be evenly distributed on the LCD panel. Each of the spherical spacers 8 is placed in respective one of the pixel-electrode contact holes 51. The spherical spacers 8 are formed of a resin such as polystyrene or of an inorganic material such as silicone dioxide; and the spherical spacers 8 are designed to have diameters matching a design distance from the bottom 54, or vicinity of deepest point, of the contact hole 51 up to a flat surface of the counter substrate 102. The design distance may vary in a range of 2 to 4 μm in general circumstance, and may be adjustable as to match a dimension of the contact hole 51. For example, the diameter of the spherical spacers 8 may be set to be smaller than diameter of bottom of the contact hole 51, so as to achieve a supporting structure for receiving compression stress, which will be explained in following by use of the FIG. 3. The diameter of the spherical spacer 8 may be set at any dimension in conformity to the diameter of the bottom of the contact hole 51.

FIG. 3 shows a sectional view of a multi-layer structure in the LCD panel, at vicinity of the pixel-electrode contact hole 51 having the spherical spacer 8. As shown in FIG. 3, the spherical spacer 8 abuts a relatively flat bottom face 52 of the contact hole 51 and at most contacts a portion of surrounding wall of the contact hole 51 at either side of one direction. Inner surface of the contact hole 51 is so sufficiently expanded outwardly from the contour face of the spherical spacer 8; no one of the spherical spacers 8 is pinched by the surrounding wall of the contact hole 51. Thus, when the array substrate 10 and the counter substrate 102 applied with a sealing material are joined together and then pressed, transmission of compression stress onto the array substrate is made only through an abutment of bottoms of the spherical spacers 8 onto bottom faces 52 of the contact holes 51.

Figure 4:
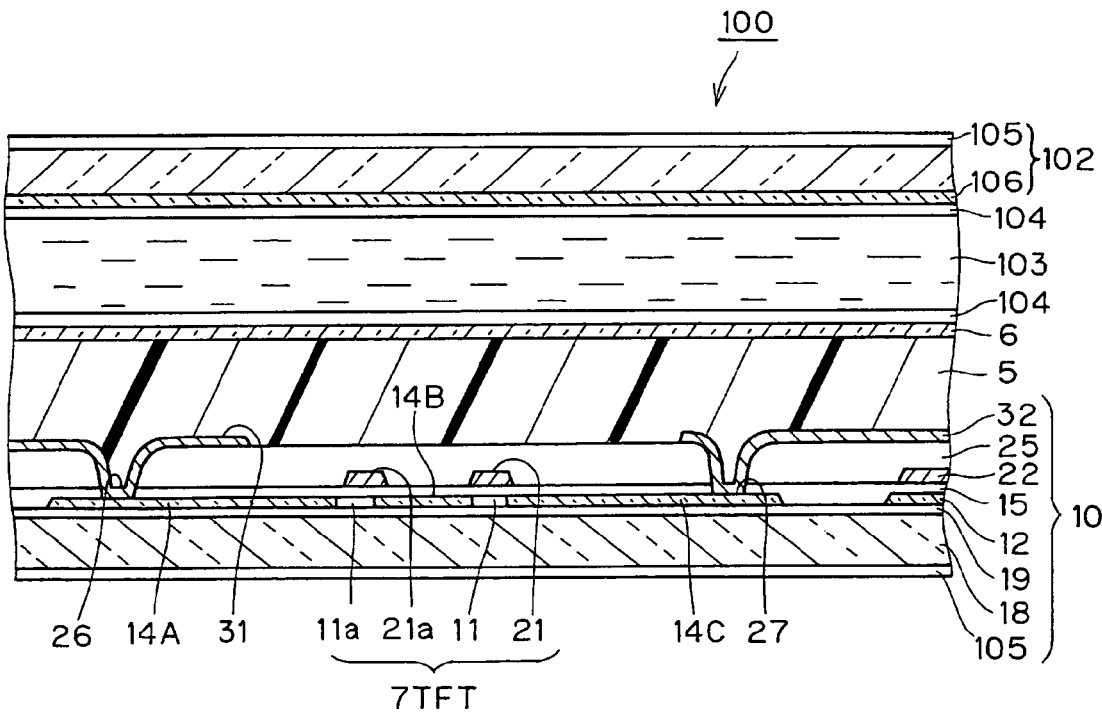
FIG. 4 is a sectional view of the LCD device of the embodiment, schematically showing a TFT and elements electrically connected to the TFT.

Meanwhile, as shown in multi-layer section views of FIGS. 3 and 4, the color filter layers are formed of a thick resin film 5, which is often referred as a flattening film. Thickness of the thick resin film 5 and depth dimension of the contact holes 51 are usually no less than 1 μm and typically in a range of 2 to 4 μm. Because the thick resin film 5 is arranged on the array substrate 10, a pattern of light-shielding film, which is often referred as "black matrix", is not formed within a pixel area, on neither of the array and counter substrates. The light-shielding film is formed only at between the sealing material and the all-around fringe of the pixel area. Additionally, a counter electrode 106 is formed on almost whole area of inward-coming face of the counter substrate 10.

The array and counter substrates 10 and 102 are joined to each other as to sandwich the sealing material arranged on all-around fringe portion of the substrates. On beforehand of such joining, alignment layers 104 are formed on inward-coming faces, which are to contact with the liquid crystal layer, of the array and counter substrates 10 and 102. On outward faces of the array and counter substrates 10 and 102, polarizer sheets 105 are attached. Although not illustrated in the drawings, driver circuits are formed on fringe portions of the display panel in the flat-panel display device 100. At along back face of the display panel, arranged are a backlight unit and a driver circuit board that is electrically connected to the fringe portion of the display panel.

In following, a manufacturing process of the LCD device in the embodiment is explained in detail by way of an example. On first hand, a manufacturing process of the array substrate is explained.

<1> First patterning: Firstly, by use of plasma CVD technique, a silicone oxide film and a silicone nitride film are deposited on a glass substrate 18 that appears in FIGS. 3 and 4, as to form a two-layer film. Then, a film is formed thereon, by use of TEOS (tetra ethyl ortho silicate: $Si(C_2H_5)_4$) as to form an undercoat layer 19 for curbing proliferation of impurity. Subsequently, by use of the plasma CVD technique, an amorphous silicone film of 50 nm thickness is deposited. Then, the glass substrate 18 is placed in a furnace so that the amorphous silicone film is subjected to a dehydrogenation process. Thereafter, melting and crystallization of the silicone film is achieved by that whole face of the silicone film is irradiated, with excimer laser light for example. Thus obtained polysilicone film is subjected to a patterning as to form; semiconductor layers for the TFTs 7; the polysilicone wirings 14; the island-wise polysilicone patterns 12 arranged to overlap the storage capacitor lines 22; and a conductive float patterns 12A on predetermined positions.

<2> Second patterning: The plasma CVD technique is used to form a gate insulator film 15 of 100 nm thickness consisting of single layer of silicone oxide. Subsequently, a sputtering technique is used to deposit a molybdenum-tungsten alloy film (Mo-W film) of 300 nm thickness for example. Then, a patterning is made to form the scanning lines 21 in number of 768, their extensions 21a, and storage capacitor lines in the same number.

<3> Third patterning: By use of the scanning lines 21 and their extensions 21a as a photomask pattern, certain parts of the polysilicone wiring 14 are doped with impurity materials or doping agents by using an ion implanter of amorphous separating type. Thus, the channel regions 11a and 12 are formed at portions where the polysilicone wirings 14 are overlapped with the gate electrodes 21 and 21a. Such TFTs of coplanar configuration may be formed in detail by a method disclosed in JP-2001-339070A for example.

Subsequently, the CVD technique is used to form an interlayer insulator film 25 consisting of a silicone oxide film in thickness of 600 nm. Then, a patterning is made to form contact holes 26 for electrically connecting the signal lines 3 with the polysilicone wirings 14. Simultaneously formed are contact holes 27 and 28 which expose, within an each area to be disposed of the L-shaped extension 33 of the metal island pattern 33; an end portion of each of the polysilicone wirings 14; and distal end portion of each of the linear extensions 13 of the island-wise polysilicone pattern 12. Although not illustrated in the drawings, also formed are contact holes for exposing terminal pads on peripheral portions of the substrate, at surroundings of the pixel area.

<4> Fourth patterning: The sputtering technique is used to deposit a molybdenum-aluminum-molybdenum three-layer metal film (Mo/Al/Mo film) for example, in which an aluminum metal layer is sandwiched by top and bottom molybdenum (Mo) layers. For example, a Mo layer of 25 nm thickness, and aluminum (AL) layer of 250 nm thickness and a Mo layer of 50 nm thickness are sequentially deposited in this order. A patterning is made on the three-layer metal film as to form the signal lines 31 in number of 1024×24 as well as the island metal patterns 32.

<5> Fifth patterning: With respect to each color of red, blue and green, the substrate is uniformly coated with a light curing resin liquid, which is formed of a colored acrylic resin or the like, at a thickness of 3 μm. This is followed by a series of processing such as; a light exposure process by use of a photomask and a development process; or in otherwise application of dye with an ink-jet technique and fixing of the dye. In this way, the thick resin film 5 having color patterns in stripe arrangement is formed so that each color is allotted to a row of the pixel dot apertures. The thick resin film 5 is provided with contact holes 51, each of which is formed during the above-mentioned light exposure process or the like to an area inside of contour of the island metal pattern 32. Width dimension of the contact hole 51 is set to be larger than the diameter of the spherical spacers 8 and in a manner; to curb immoderate wandering of the spherical spacers 8 and in same time to assure that the stress transmission is made only through contact of the spherical spacers 8 onto the bottom face 52. When the bottom face 52 of the contact hole 51 is shaped as curved, the radius of the spherical spacers 8 is designed to be smaller than a radius of curvature of the bottom face 52. If necessary or appropriate, an inorganic interlayer insulator film consisting of silicone nitride and/or the like may be formed on beforehand of forming the thick resin film 5. Meanwhile, as mentioned later, spherical spacers 8 are arranged by a distribution density of one in 2 to 8 pixel dots.

<6> Sixth patterning: As a transparent conductive layer, ITO layer of 150 nm thickness for example is deposited; and the patterning is made to form pixel electrodes 6 and the pixel-electrode extensions 61, as well as ITO films covering the terminal pads, simultaneously. Thus, an array substrate 10 is completed.

<7> Formation of alignment layers: On the array substrate 10, a resin film formed of polyimide is formed and then subjected to rubbing process as to form an alignment layer 104. In same manner with this, an alignment layer 104 is also formed on a surface of the counter substrate, which surface already has the counter electrode and is to contact with the liquid crystal material 103.

<8> Application of sealing material: On the array substrate 10 after formation of the alignment layer 104, sealing material is applied by use of a dispenser-type coating device at along all-around fringe of the array substrate 10.

<9> Arranging of the spherical spacers 8: On the array substrate 10 after formation of the alignment layer 104, each of the spherical spacers 8 is shot into a designated contact hole 51, by use of ink-jet technique.

Figure 5:
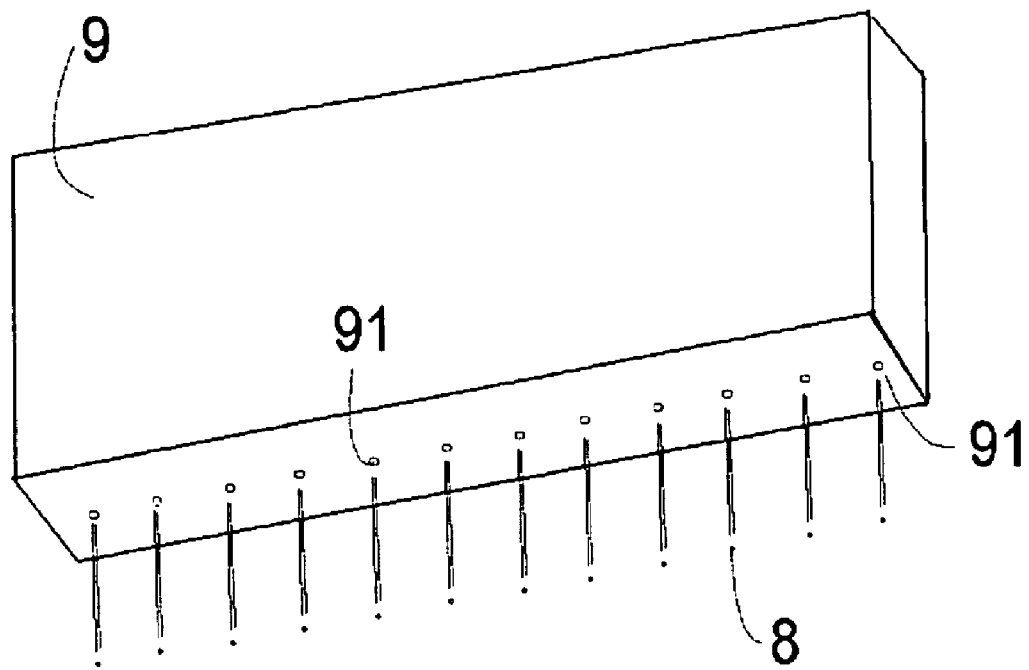
FIG. 5 is a perspective view schematically showing a nozzle head of the ink-jet device.

Ink-jet device spurts out fluid by thermal expansion or piezoelectric mechanism and has a nozzle head 9 in a manner of a horizontal beam shown in FIG. 5. On bottom face of the nozzle head 9, a number of nozzle apertures 91 are arranged at a constant interval, for example, at interval of 100 μm. The nozzle head 9 intermittently travels by a constant interval and then spurts out the fluid. The nozzle head 9 may be obliquely oriented to take any angle with an edge of the array substrate 10 while being kept in parallel to a main surface of the array substrate 10. The nozzle head 9 may travel intermittently at the obliquely oriented state as to scan the main surface of the array substrate 10. The angle of the oblique orientation is set in such a manner that interval of the designated contact holes 51 agrees interval of the nozzle apertures 91. The spurting from each of the nozzle apertures 91 is controlled independently with other ones of the apertures, in respect of timing of the spurting, carrying out or skipping of the spurting, or the like. For example, the spurting is made by every other nozzle aperture, that is, only by each first one among the two consecutive ones of the nozzle apertures 91.

Diameter of the spherical spacers 8 may be set to be a sum of; depth of the contact hole 51, which is thickness of the thick resin film 6 and is about 3 μm for example; and a design distance between the pixel electrode 6 and the counter electrode 106, which distance is about 4 μm for example. The diameter of the spherical spacers 8 may be set at 6-8 μm for example. An example of dispersion medium for the spherical spacers 8 is 80% iso-propanol aqueous Solution, which is a mixture of water in 20 weight % and iso-propanol (iso-propyl alcohol) in 80 weight %. In order to achieve adhesion on the array substrate 10, the spherical spacers 8 are coated on beforehand with adhesive for example. Then, on course of evaporation of the dispersion medium, each of the spherical spacers 8 is stuck on the bottom 52 of the contact hole 51 by way of an adhesive layer.

In the above, process of "<8> Application of sealing material" may be made after a process of "<9> Arranging of the spherical spacers 8".

<10> Attaching the two substrates: The array and counter substrates 10 and 102 are joined with each other by sandwiching the sealing material; and then subjected to heat pressing as to achieve curing of the sealing material.

<11> Liquid crystal injection and scribe-cutting: The liquid crystal material is injected into a gap between the two substrates, through an injection aperture formed of the sealing material. Then, the injection aperture is closed as sealed off; and subsequently, panel of original large size is subjected to scribe-cutting to cut out panels each corresponding an LCD device.

<12> Attaching of polarizer sheets: Finally, on outer faces of thus obtained panel, polarizer sheets 105 are attached respectively, as to complete an LCD panel.

In the above detailed example explained hereto, the LCD device of polysilocone TFTs is exemplified; while same goes with LCD device of amorphous TFTs, except for procedures for the melting and crystallization in process of "<1> First patterning". In the above detailed example, the spherical spacers are explained as received in contact holes 51 that are for electrically connecting the pixel electrodes 5 and the island metal patterns for forming storage capacitor; while the spherical spacers 8 may be designed to be received in contact holes for electrically connecting the pixel electrodes 5 and the source electrode terminals of the TFTs. In some circumstances, the spherical spacers 8 may be designed to be received in recesses other than contact holes.

What is claimed is:
1. An LCD device comprising:
a first substrate that is an array substrate having a plurality of scanning lines, a plurality of signal lines perpendicularly crossing the scanning lines, pixel electrodes each arranged on a pixel dot, and switching elements each disposed in the vicinity of a crossing of the scanning and signal lines;
a second substrate;
a liquid-crystal layer formed of a liquid crystal material and sandwiched between the substrates;
spherical spacers arranged between the substrates; and
a plurality of contact holes, which are perforating an underlying layer for the pixel electrodes and arranged on a surface of the array substrate contacting the liquid-crystal layer and each of which electrically connects a pixel electrode on said surface of the array substrate to a terminal of the switching element,
wherein:
each of the spherical spacers is placed in a respective one of the contact holes;
the spherical spacers are evenly distributed by a distribution density of one in 2 to 8 pixel dots;
the sectional area through the center of each of the spherical spacers is smaller than the area of the bottom face of the associated contact hole; and the contact hole occupies between 60 and 70% of an area of a pixel-electrode extension overlapping a storage capacitor line.

2. The LCD device according to claim 1, wherein:
is a resin film having a thickness no less than 1 μm.

3. The LCD device according to claim 2, wherein:
the resin film includes at least partly a color filter layer that is formed of colored resin.

4. A method of manufacturing an LCD device having a liquid-crystal layer that is formed of a liquid crystal material and sandwiched between first and second substrates, said method comprising:

forming, on a main face of the first substrate, a plurality of scanning lines, a plurality of signal lines perpendicularly crossing the scanning lines, switching elements each disposed in the vicinity of a crossing of the scanning lines and the signal lines, and pixel electrodes each arranged on a pixel dot;

forming a plurality of contact holes, which are perforating an underlying layer for the pixel electrodes and distributed on a main face of either of the first and second substrates and each of which electrically connects the pixel electrode and a terminal of the switching element; and preparing a plurality of spherical spacers, each in a respective one of the contact holes, so that the spherical spacers are evenly distributed by a distribution density of one in 2 to 8 pixel dots, wherein:
each of the contact holes electrically connects the pixel electrode and a terminal of the switching element;
the sectional area through the center of each of the spherical spacers is smaller than the area of the bottom face of the associated contact hole;
said preparing is made by an ink-jet technique;
the spherical spacers are discretely dispersed in a dispersion medium that is used for the ink-jet technique and that contains adhesive; and
the contact hole occupies 60 through 70% of an area of a pixel-electrode extension overlapping a storage capacitor line.

5. The method of manufacturing an LCD device according to claim 4, wherein:
an ink-jet device adapted to implement the ink-jet technique is comprised of a nozzle head having a plurality of nozzle apertures;
each of said nozzle apertures is configured to shoot out the spherical spacers;
said preparing step further includes shooting out the spherical spacers from each of the nozzle apertures; and
each of the nozzle apertures is controlled independently from the other nozzle apertures in respect of its actuation and its timing.

6. The method of manufacturing an LCD device according to claim 5, wherein:
the nozzle head is horizontally movable in parallel with a main surface of the first substrate.

7. The method of manufacturing an LCD device according to claim 4, further comprising forming a resin film as the underlying layer interlaid between the switching elements and the pixel electrodes.

8. The method of manufacturing an LCD device according to claim 7, wherein:
said forming of the resin film is at least partly comprised of forming of a color filter layer.

9. The method of manufacturing an LCD device according to claim 6, wherein:
the nozzle head produces a horizontal beam;
the nozzle apertures are arranged on a bottom face of the nozzle head at a constant interval; and
the nozzle head is obliquely oriented with respect to an edge of the first substrate at an angle at which the interval of designated ones of the contact holes agrees with the interval of the nozzle apertures.

10. The method of manufacturing an LCD device according to claim 9, wherein:
three to five of the spherical spacers are arranged on every sixteen pixel dots so as to be evenly distributed.

11. The method of manufacturing an LCD device according to claim 4, wherein:
the dispersion medium is an iso-propanol aqueous solution.

* * * * *